No. 724,004. PATENTED MAR. 31, 1903.
D. T. GRANBERY.
CAR COUPLING AND TRAIN PIPE COUPLING COMBINED.
APPLICATION FILED JUNE 23, 1900.
NO MODEL. 5 SHEETS—SHEET 1.
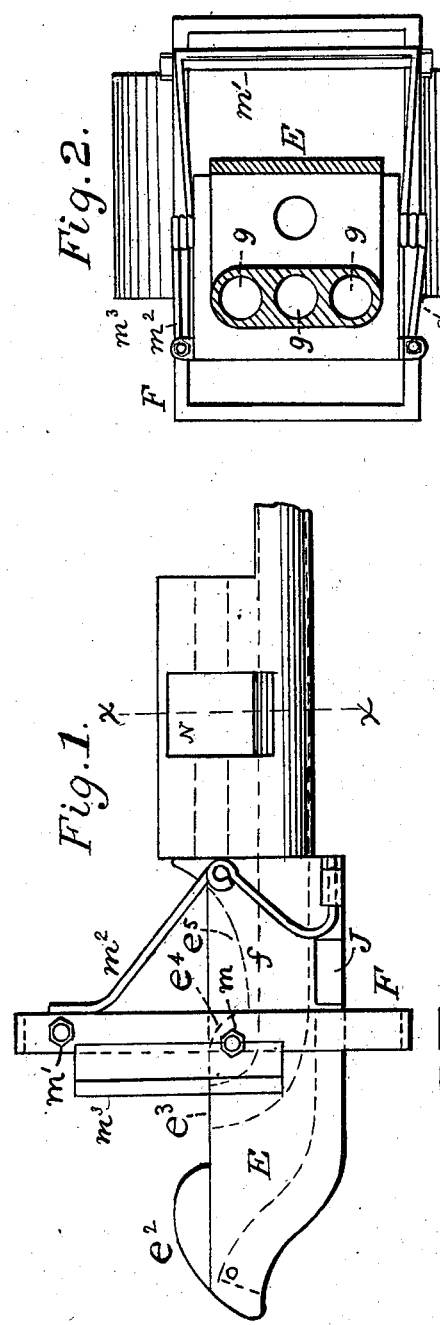
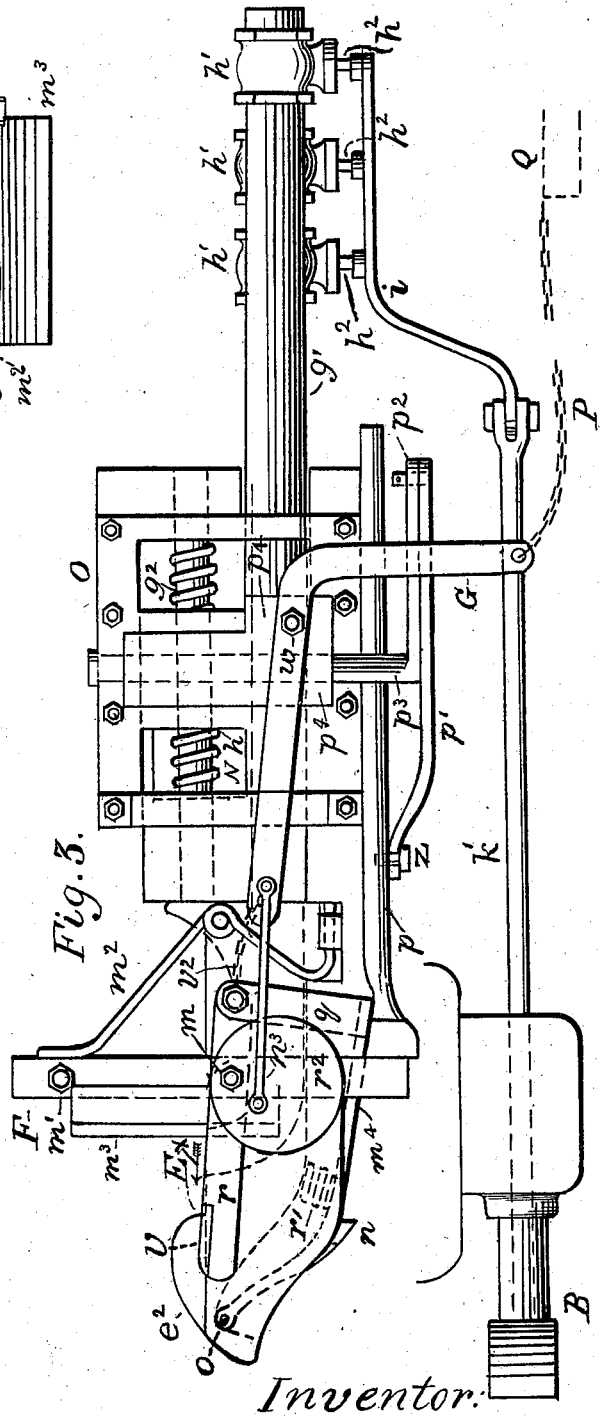
Witnesses:
Raymond Richardson
E. Caven
Inventor:
Dee T. Granbery
By A. W. Willson Co.
Attorneys

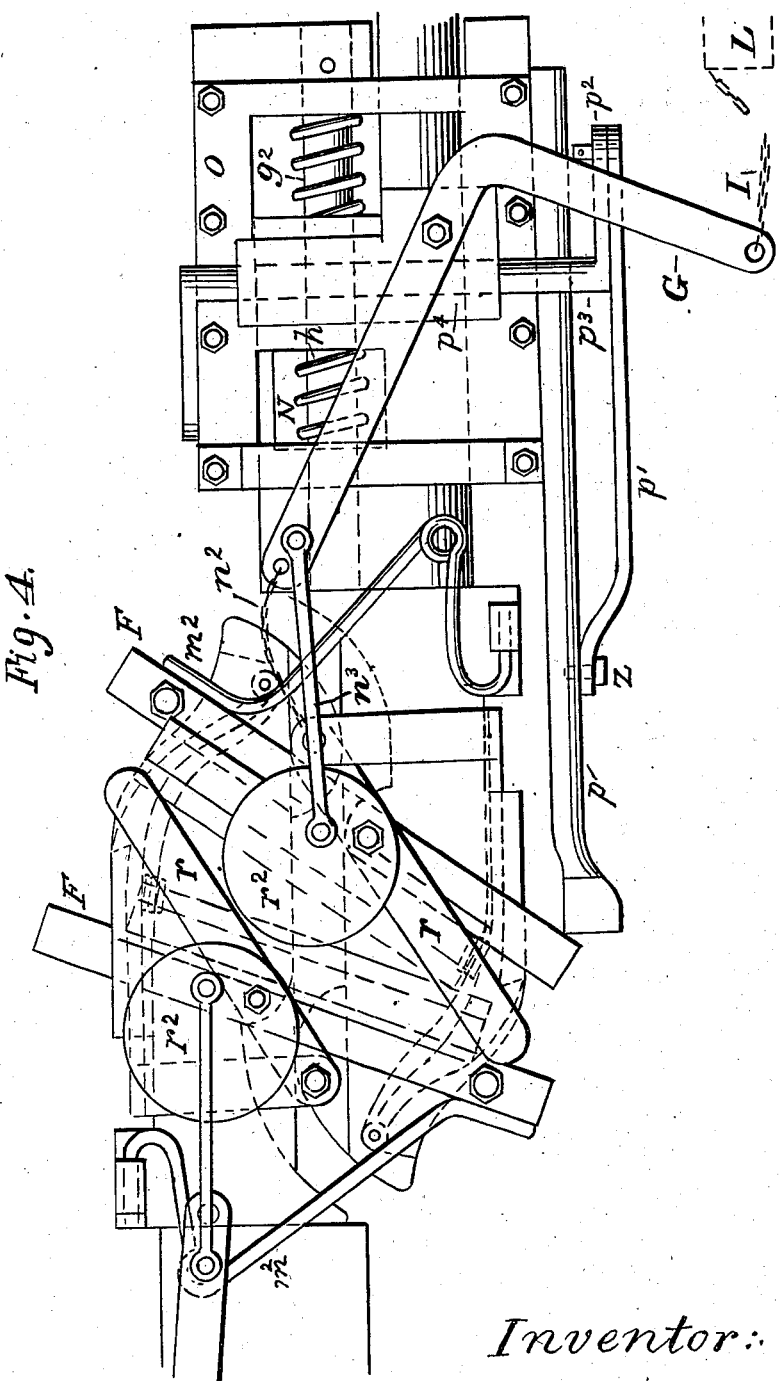

No. 724,004. PATENTED MAR. 31, 1903.
D. T. GRANBERY.
CAR COUPLING AND TRAIN PIPE COUPLING COMBINED.
APPLICATION FILED JUNE 23, 1900.
NO MODEL. 5 SHEETS—SHEET 3.

Witnesses:
Raymond Richardson
E. Caven

Inventor:
Dee T. Granbery
By N. W. Willson
Attorneys.

No. 724,004. PATENTED MAR. 31, 1903.
D. T. GRANBERY.
CAR COUPLING AND TRAIN PIPE COUPLING COMBINED.
APPLICATION FILED JUNE 23, 1900.
NO MODEL. 5 SHEETS—SHEET 4.

No. 724,004. PATENTED MAR. 31, 1903.
D. T. GRANBERY.
CAR COUPLING AND TRAIN PIPE COUPLING COMBINED.
APPLICATION FILED JUNE 23, 1900.
NO MODEL. 5 SHEETS—SHEET 5.

Witnesses:
Raymond Richardson
E. Caven.

Inventor:
Deg T. Granbery
By A. W. Willedio
Attorneys

UNITED STATES PATENT OFFICE.

DEE T. GRANBERY, OF MEMPHIS, TENNESSEE.

CAR-COUPLING AND TRAIN-PIPE COUPLING COMBINED.

SPECIFICATION forming part of Letters Patent No. 724,004, dated March 31, 1903.

Application filed June 23, 1900. Serial No. 21,355. (No model.)

*To all whom it may concern:*

Be it known that I, DEE T. GRANBERY, a citizen of the United States, residing at Memphis, in the county of Shelby and State of Tennessee, have invented certain new and useful Improvements in Car-Couplings and Train-Pipe Couplings Combined, of which the following is a specification.

This invention relates to car-couplings and train-pipe couplings combined; and it consists in certain improvements in the construction of the same, as hereinafter described and claimed.

Figure 5:
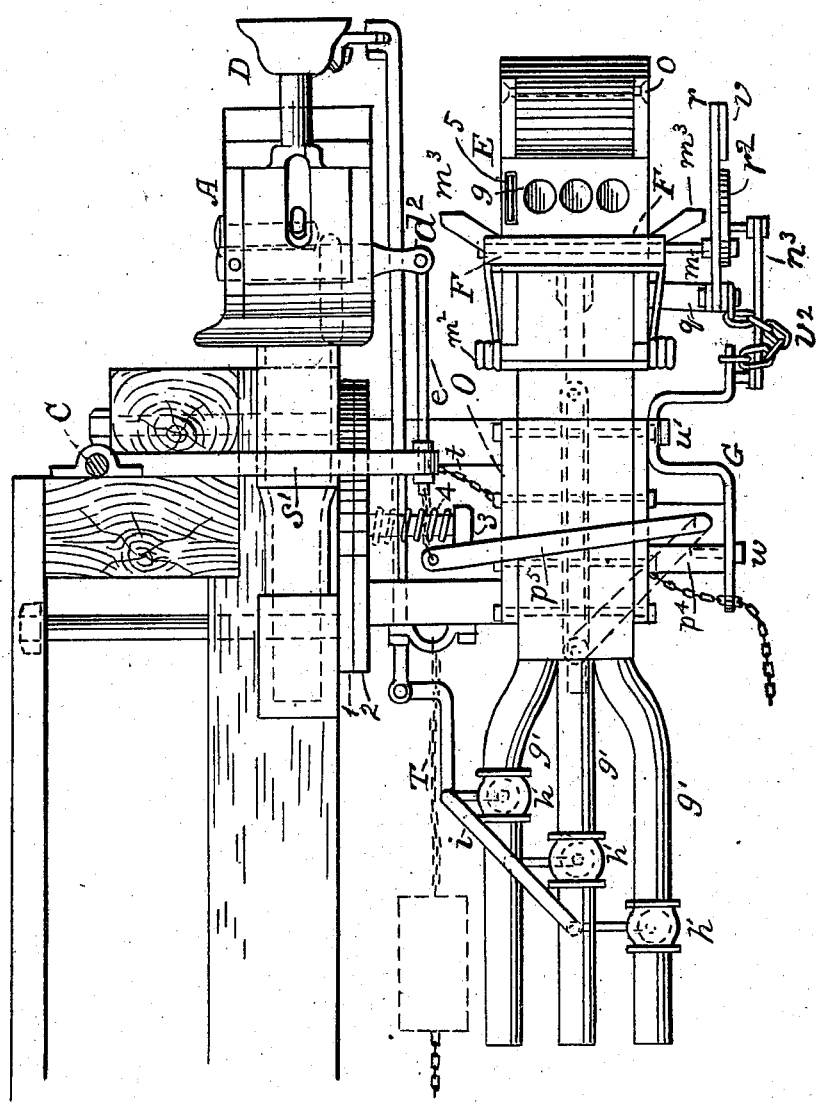
Figure 6:
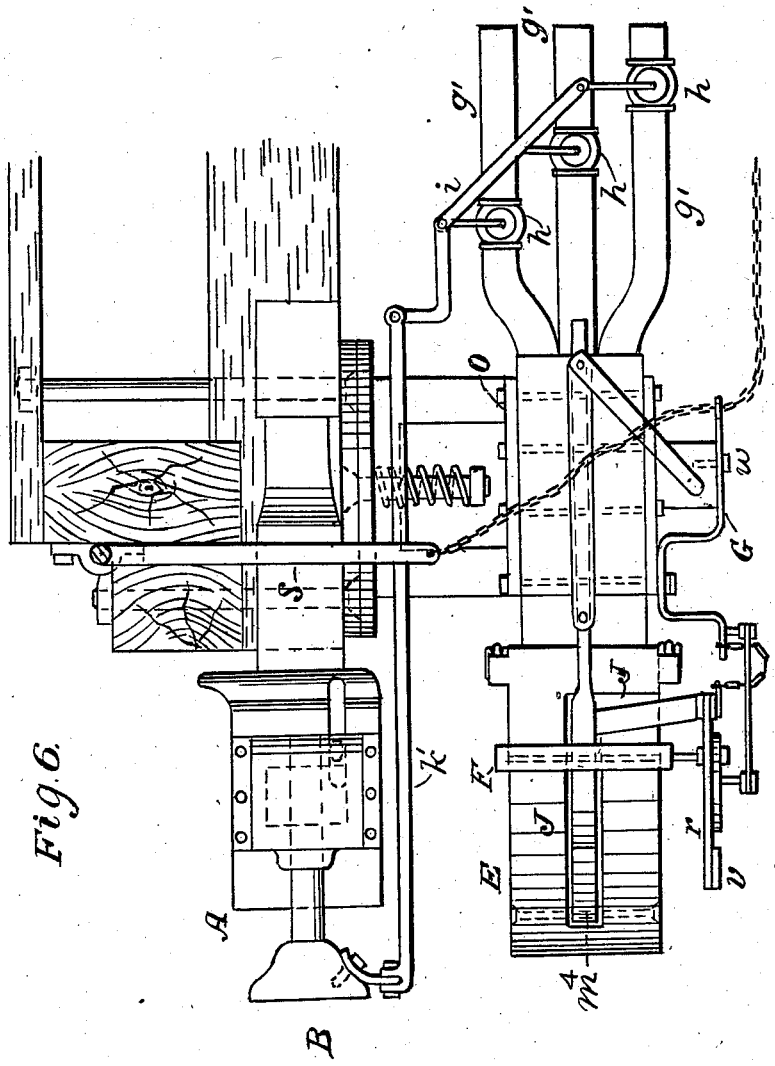
Figure 7:
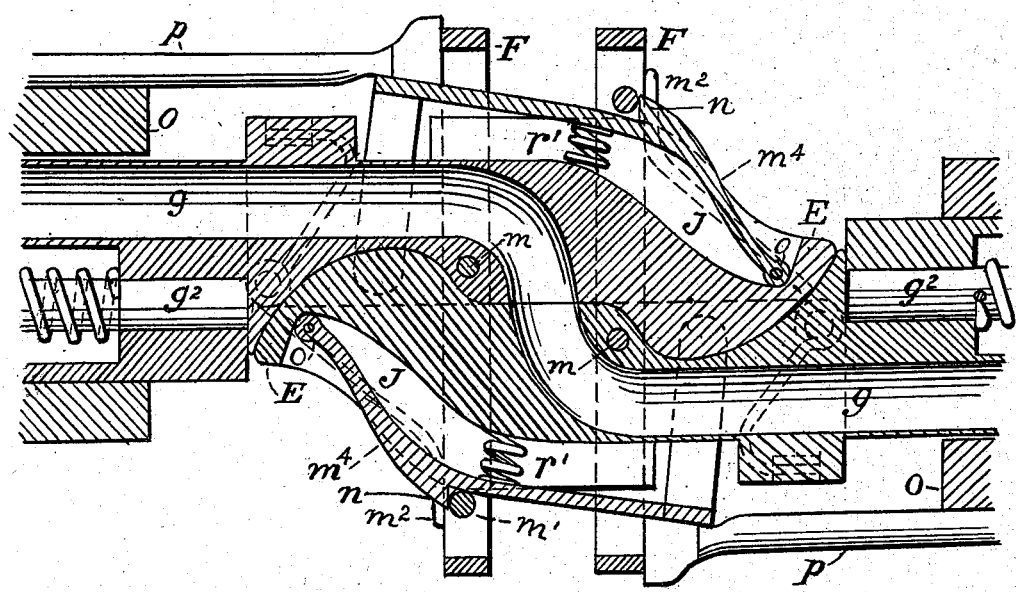
Figure 8:
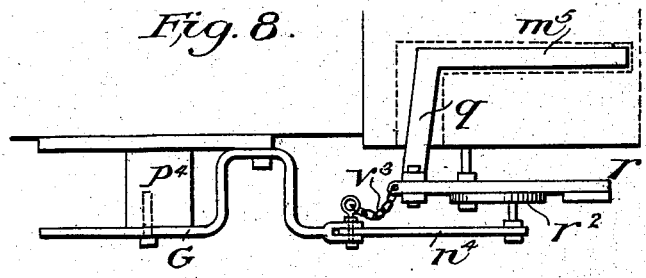

In the accompanying drawings, Figure 1 is a plan view of one of the train-pipe-coupling heads. Fig. 2 is a transverse section taken on line X X of Fig. 1. Fig. 3 is a plan view of the under side of a pipe-coupling head with other details. Fig. 4 is an under side view showing two pipe-heads uncoupled. Fig. 5 is a side view showing one side of a drawhead of the car-coupling and of the pipe-coupling head in connection. Fig. 6 is a side view showing the sides of the draw-head and the pipe-coupling head opposite to those shown in Fig. 5. Fig. 7 shows in horizontal section the pipe-coupling heads as coupled. Fig. 8 shows modifications in the construction of certain mechanism connected with the pipe-coupling heads.

E indicates the pipe-coupling heads, each of which is formed substantially as shown in Fig. 1, conforming to each other on their inner faces to form a close joint, (see Figs. 7 and 1,) each head having a curved surface or convexity $e^2$ at its free end, then a plane surface $e^3$, next to which is a convexity $e^4$, and next to the latter is a concavity $e^5$. Each pipe-head having the sides $f$, a seat is formed by the concavity $e^5$ and the side pieces to receive the convex portion $e^2$ of the joining pipe-head when a coupling of the heads is effected. Tubular passages $g$ are made in each of the pipe-heads E, three passages in each head being shown, said passages extending rearward from corresponding points in the planes $e^3$ of the pipe-heads to the rear ends of the heads. The passages $g$ of one head connect with those in the other when the two heads are coupled, as seen in Fig. 8. From the tubular passages $g$ extend branch pipes $g'$ for conveying steam, heat, and air from car to car and for the purpose of a whistle, the connection of pipes of one car with those of another being formed of elastic hose. A spring-rod $g^2$ is provided for each pipe-head, the latter being recessed at N, showing the spring $h$. The pipe-head extends rearward into a casing O, in which the spring-rod also has bearing, so that the pipe-head has somewhat of a movement in said casing. The branch pipes $g'$ are each provided with a valve $h'$, having a stem $h^2$, which is connected with a rod $i$, the latter being connected with a horizontal rod $k'$, which extends forward and is connected with the spring-buffer B, so that said valves are operated by the action of said buffer.

F indicates a rectangular frame, one being pivotally mounted on each pipe-head, the connection being by a bolt or rod $m$, passed through the head, which latter extends through said frame. Another rod $m'$ is mounted in the frame F, said rod extending across it near the outer side of the pipe-head. Springs $m^2$, one of which is connected with each pipe-head, are adapted to bear against the frames F and hold them in position for coupling. (See Figs. 1 and 2.) Guard-horns $m^3$, carried by the frames F, serve to bring the pipe-heads to their proper relative position in case when two cars are coming together the two heads are not exactly on the same level. The guard-horns also serve to press backward the frames F when uncoupling, as the rods $p$ move against said frames, as hereinafter stated.

To the outer side of the casing O is movably secured in suitable bearings a rod or shaft $p$, adapted to be moved longitudinally and to bear against the frame F. (See Figs. 3 and 6.) To the shaft $p$ is secured at $z$ one end of a connecting-rod $p'$, the other end of said rod being connected with an arm $p^2$ of a shaft $p^3$, which is mounted in an offset $p^4$ of the casing O and extends to the opposite side of said casing and has an arm $p^5$, which extends upward and has a link connection with a branch $s'$ of the horizontal shaft C, which is mounted in bearings on one end of the cartruck. (See Figs. 3 and 5.)

Mounted in a recess J in the outer side of each pipe-head is a spring-lock $m^4$, which is connected at the forward end with the pipehead by a bolt $o$, the rearward end of the lock being made fast to a bar $q$, which extends downward and is then turned under the pipe-head and is connected with a rocking bar $r$, which is on the extended end of the rod $m$, which connects the frame F with the pipe-head. The spring-lock $m^4$ is formed with a catch $n$, which is projected for locking by a spring $r'$ in the recess J. When the pipe-heads are coupled, the catches $n$ of the locks connect with the rods $m'$ of the frames F, (see Fig. 7,) and said frames are held in position by the shafts $p$ and by the springs $m^2$. Circular disks $r^2$ are eccentrically connected with the rocking bars $r$ by the rods $m$, said disks having limited rotative movements, such movements being toward and against the projections $v$ on the bars $r$.

G indicates a bent lever, which is pivoted at $w$ to the offset $p^4$ of the casing O and has a bearing or guide $u'$. The lock-bar $q$ is connected by a chain $v^2$ with the bent lever G, and a disk $r^2$ is connected with said bent lever by connecting-rod $n^3$. The rearward end of the lever G is connected by a chain P with a retracting-spring Q to return the lever to its position after its movement. Said lever G is also connected by a chain S with the branch $s$ of the horizontal shaft C.

T indicates a chain which connects a spring with the truck-bolster to hold the pipe-coupling in position when the train is rounding curves.

The draw-head A, having tail-pin R, extends between the truck-timbers, to which is secured by bolts the upper bearing-plate 1, the lower bearing-plate 2 being connected by a bolt 3, extending downward into the buffer and having thereon a spring 4.

A copper plate (marked 5, see Fig. 5) is set in the pipe-coupling head for the purpose of suitable attachments for electrical connections of cars for purpose of lighting and also for signaling between the conductors and other employees.

As will be seen, the car-coupling may be operated to uncouple by means of the vertical lever $d^2$ or by lever $c'$ and may be uncoupled automatically by the action of the spring-buffer B and levers $d'$ and $d^2$, and by movement of the branched shaft C, which has a handle at either end for such purpose, the connections are such between said shaft and the lever $d^2$ of the car-coupling and the lever G, connected with the pipe-coupling head, that the uncoupling of cars and train-pipes may be simultaneously effected. When two cars come together, the coupling of the cars and also of the train-pipes is automatic.

In Fig. 8 are shown certain modifications in the construction of certain details shown in Figs. 5 and 6. The bent lever G' has a forked end to receive the connecting-rod $n^4$ and is secured thereto by an eyebolt, which is connected by a chain $v^3$ with the lever $r$.

As will be seen, the operation of uncoupling is effected by a partial rotation of the shaft C through its branches $s$ and $s'$, one of which is connected by a chain with the rearward end of the bent lever G, the forward end of said lever being connected by a chain with the lock-bar $q$ and by a rod $n^3$ with a circular disk $r^2$, which is eccentrically connected with a rocking bar $r$, the disk to rotate in the direction of the arrow $x$ in Fig. 3 to the stop $v$ on the bar $r$ of an opposite pipe-head. When the shaft C is turned by either handle, so as to move forward both of the arms $s\ s'$, the rearward end of the lever G is moved forward and the forward end of said lever is turned backward by the drawing of the chain P, connected with the arm $s$ of shaft C. The disk $r^2$ is partially rotated by the rod $n^3$. The forward end of the lever G being connected by a chain with the bar $q$, the latter is drawn inward enough by the movement of the lever to move the spring-lock with its catch $n$ into the recess J out of connection with the bolt $m'$. The shaft $p^3$, which extends across the casing O, by its chain connection of the arm $p^5$ and with the arm $p^2$ and connecting-rod $p'$, connected with the bar $p$, actuates the latter, moving it forward to engage the frame F and move said frame to position for uncoupling.

I claim—

1. The combination, with a pipe-coupling head, of a casing into which said pipe-head extends, a two-arm shaft carried by said casing, one arm of said shaft being connected with a longitudinal rod adapted to move against a frame pivotally mounted on said pipe-head and the other arm of said shaft having a link connection with a branch of a horizontal shaft C, carried by the car-truck, and a vertical lever pivotally mounted in a draw-head of the car-coupling and connected by a rod with said branch of the shaft C.

2. The combination with a pipe-head having a recess J in its outer side, of a spring-lock secured therein by a bolt at its forward end and provided with a catch $n$, a bar $q$ connected with said lock and extending downward and under said pipe-head, a rocking lever provided with a projection $v$, carried by said pipe-head and connected with bar $q$, a circular disk eccentrically mounted and connected with said rocking lever, a bent, pivoted lever one end of which is connected by a chain with a branch of the shaft C, said lever also having a link connection with the spring-lock, and a rod connecting said bent lever with said circular disk, substantially as and for the purposes described.

3. The combination with a pipe-head of a pivoted rectangular frame provided with a crossing rod, a spring-lock mounted in a recess of said pipe-head and provided with a catch $n$, adapted to connect with a crossing rod of a similar rectangular frame connected with an opposite pipe-head, when two pipe-heads are coupled, substantially as and for the purposes described.

In testimony whereof I affix my signature in presence of two witnesses.

DEE T. GRANBERY.

Witnesses:
GUY W. MOORE,
C. J. BENTLEY.